(12) United States Patent
Tsubouchi et al.

(10) Patent No.: US 7,956,226 B2
(45) Date of Patent: Jun. 7, 2011

(54) TRACTION DRIVE FLUID COMPOSITIONS

(75) Inventors: Toshiyuki Tsubouchi, Chiba (JP); Yukio Yoshida, Chiba (JP); Hidetoshi Koga, Chiba (JP)

(73) Assignee: Idemitsu Kosan Co., Ltd, Tokyo (JP)

( * ) Notice: Subject to any disclaimer, the term of this patent is extended or adjusted under 35 U.S.C. 154(b) by 398 days.

(21) Appl. No.: 10/527,528

(22) PCT Filed: Sep. 18, 2003

(86) PCT No.: PCT/JP03/11897
§ 371 (c)(1),
(2), (4) Date: Mar. 11, 2005

(87) PCT Pub. No.: WO2004/026998
PCT Pub. Date: Apr. 1, 2004

(65) Prior Publication Data
US 2006/0049081 A1    Mar. 9, 2006

(30) Foreign Application Priority Data
Sep. 18, 2002 (JP) ................................. 2002-271742

(51) Int. Cl.
*C10M 105/04* (2006.01)
(52) U.S. Cl. ................ 585/12; 585/20; 585/21; 585/22; 508/110; 508/591; 252/73
(58) Field of Classification Search ............... 585/12, 585/20, 21, 22; 508/591
See application file for complete search history.

(56) References Cited

U.S. PATENT DOCUMENTS

| | | | |
|---|---|---|---|
| 3,577,361 A | | 5/1971 | Hammann et al. |
| 4,162,985 A | * | 7/1979 | Holubec ......................... 508/338 |
| 4,871,476 A | * | 10/1989 | Yoshimura et al. ............ 508/505 |
| 4,889,649 A | * | 12/1989 | Murai et al. ..................... 252/73 |
| 5,126,065 A | * | 6/1992 | Tsubouchi et al. ............ 508/591 |
| 5,276,227 A | * | 1/1994 | Wu et al. ......................... 585/12 |
| 5,283,384 A | * | 2/1994 | Abe et al. ........................ 585/22 |
| 5,344,582 A | * | 9/1994 | Umemoto et al. ............. 508/110 |
| 6,191,330 B1 | * | 2/2001 | Matsuno et al. ................ 585/21 |
| 6,303,550 B1 | * | 10/2001 | Wedlock et al. .............. 508/591 |
| 6,319,879 B1 | * | 11/2001 | Yoshida et al. ............... 508/110 |
| 6,320,088 B1 | * | 11/2001 | Matsuno et al. ................ 585/21 |
| 6,372,696 B1 | * | 4/2002 | Tipton ........................... 508/110 |
| 6,638,417 B2 | * | 10/2003 | Ishida et al. ..................... 208/19 |
| 6,841,713 B2 | * | 1/2005 | Tsubouchi et al. ............ 585/664 |
| 7,045,488 B2 | * | 5/2006 | Bartley et al. ................. 508/110 |

FOREIGN PATENT DOCUMENTS

| | | |
|---|---|---|
| DE | 2147390 | 3/1972 |
| DE | 10111973 | 9/2001 |
| EP | 208541 | 1/1987 |
| EP | 326975 | 8/1989 |
| EP | 949319 | 10/1999 |
| EP | 989177 | 3/2000 |
| GB | 1357406 | 6/1974 |
| JP | 61-19698 | 1/1986 |
| JP | 61019697 | 1/1986 |
| JP | 61-188495 | 8/1986 |
| JP | 2000-204583 | 7/2000 |
| JP | 2002-155292 | 5/2002 |
| WO | 88/10293 | 12/1988 |
| WO | 89/01021 | 2/1989 |
| WO | 95/06701 | 3/1995 |
| WO | 00/63323 | 10/2000 |

\* cited by examiner

*Primary Examiner* — Ellen M McAvoy
(74) *Attorney, Agent, or Firm* — Oblon, Spivak, McClelland, Maier & Neustadt, L.L.P.

(57) ABSTRACT

A traction drive fluid composition which comprises component (A) a base oil for traction drives bearing at least one selected from a quaternary carbon atom or an alicyclic structure in the molecule and component (B) at least one polymer having a weight average molecular weight in the range of 8,000 to 40,000 and which is selected from among (a) hydrocarbon polymers each containing as a constituent at least 10 mole % of a monomer bearing a cyclic structure, (b) hydrocarbon polymers each containing at least 25% of quaternary carbon atoms in the backbone chain, and (c) hydrogenated products from the polymers (a) and (b). The traction drive fluid composition is improved in viscosity index without lowering the traction coefficient to a level lower than that of the base oil and is excellent in shear stability.

27 Claims, No Drawings

TRACTION DRIVE FLUID COMPOSITIONS

CROSS REFERENCES TO RELATED APPLICATIONS

This application is a national stage application of International Patent Application No. PCT/JP03/11897, filed on Sep. 18, 2003, and claims priority to Japanese Patent Application No. 2002-271742, filed on Sep. 18, 2002, both of which are incorporated herein by reference in their entireties.

TECHNICAL FIELD

The present invention relates to a traction drive fluid composition, more particularly to a traction drive fluid composition which is improved in viscosity index and is excellent in shear stability, and in which its traction coefficient is not lower than that of a base oil.

BACKGROUND ARTS

Since a traction drive type continuously variable transmission (CVT) used for an automobile has a large torque transmission capacity and is used under severe conditions, it is indispensable from the viewpoint of power transmission that a traction oil to be used in a CVT has a traction coefficient which is sufficiently higher than a lowest value in the range of working temperature, that is, the traction coefficient at a high temperature (140° C.) is sufficiently higher than a design value of a CVT.

The traction oil, which also plays a role as an ordinary lubricating oil in a CVT, is required to have high viscosity capable of maintaining sufficient oil films even at a high temperature to prevent friction and/or wear and at the same time, to have low viscosity even at a low temperature for the sake of low temperature startup in cold districts such as North America and North Europe. That is to say, it is necessary that the traction oil has a high viscosity index minimized in variation in viscosity with temperature.

On the basis of the understanding of the above-mentioned background, the present inventors developed a high performance base oil which is for a traction oil and which has a high traction coefficient at a high temperature and a high viscosity index, said high performance has never heretofore been realized {Japanese Patent Application Laid-Open No. 17280/2000 (Heisei 12)}, but from the aspect of practical application, there was need to further add a viscosity index improver to the base oil thus developed. However, since even a small amount of addition of a previously known viscosity index improvers markedly lowers traction coefficient at a high temperature, it has been eagerly desired to develop a viscosity index improver which can improve viscosity index without lowering the traction coefficient of a base oil and which is well suited for traction oils.

There is disclosed in Japanese Patent Application Laid-Open No. 19698/1986 (Showa 61), a traction oil composition which comprises a base oil and a hydrogenation product of a thermoplastic resin bearing an aromatic ring blended therewith, and which is enhanced in viscosity index and traction coefficient. However, it is impossible to judge whether the composition is excellent or not from the practical application, since it is highly volatile owing to a low molecular weight and is composed of practically unsuitable bicyclohexyl compound as a base oil.

There is disclosed polymethacrylate having an alicyclic structure as a viscosity index improver for traction oils {for instance, refer to Japanese Patent Application Laid-Open No. 19697/1986 (Showa 61), Japanese Examined Patent Application Publication No. 62984/1994 (Heisei 6) and Japanese Patent Application Laid-Open No. 19371/2002 (Heisei 14)}. Nevertheless it is difficult to use the same as the case may be, in traction oils under severe working conditions because of insufficient shear stability.

DISCLOSURE OF THE INVENTION

The present invention has been achieved from the above-mentioned viewpoint, and it is an object thereof to provide a traction drive fluid composition which is improved in viscosity index, is excellent in shear stability, and is imparted with a traction coefficient not lower than that of a base oil.

As the result of intensive extensive research and investigation accumulated by the present inventors, it has been discovered that specific polymers each having a weight average molecular weight in the range of 8,000 to 40,000 possess excellent performances as a viscosity index improver for traction oils. The present invention has been accomplished by the foregoing findings and information.

That is to say, the gist of the present invention is as follows.

1. A traction drive fluid composition which comprises component (A) a base oil for traction drives bearing a quaternary carbon atom and/or an alicyclic structure in the molecule and component (B) at least one polymer having a weight average molecular weight in the range of 8,000 to 40,000 and which is selected from among (a) hydrocarbon polymers each containing as a constituent at least 10 mole % of a monomer bearing a cyclic structure, (b) hydrocarbon polymers each containing at least 25% of quaternary carbon atoms in the backbone chain, and (c) hydrogenated products from the polymers (a) and (b);
2. The traction drive fluid composition as set forth in the preceding item 1, wherein the polymer as the component (B) has a weight average molecular weight in the range of 9,000 to 38,000;
3. The traction drive fluid composition as set forth in the preceding item 1 or 2, wherein the base oil as the component (A) has a traction coefficient at 140° C. of at least 0.070, kinematic viscosity at 40° C. in the range of 10 to 25 mm$^2$/s, a viscosity index of at least 60, a pour point of minus 40° C. or lower and a flash point of 100° C. or higher;
4. The traction drive fluid composition as set forth in the preceding item 1, wherein the polymer as the component (B) is blended in an amount of 0.1 to 20% by mass based on the composition with the base oil as the component (A); and
5. The traction drive fluid composition as set forth in the preceding item 1, wherein the polymer as the component (B) is blended in an amount of 0.5 to 5% by mass based on the composition with the base oil as the component (A).

THE MOST PREFERRED EMBODIMENTS TO CARRY OUT THE INVENTION

In the following, the present invention will be described in detail. The base oil bearing a quaternary carbon atom and/or an alicyclic structure in the molecule as the component (A), which is exemplified by isoparaffin bearing a quaternary carbon atom such as polybutene, polyisobutylene, diisobutylene oligomer and the like; naphthenic compounds bearing an alicyclic structure such as cyclohexane ring, bicycloheptane ring, bicyclooctane ring and the like, needs to have a high traction coefficient, and may be above-mentioned base oil that is usually employed as a traction drive base oil. Preferably, the base oil satisfies the requirements including a traction coefficient at 140° C. being at least 0.070, kinematic viscosity at 40° C. being in the range of 10 to 25 mm²/s, a viscosity index of at least 60, a pour point of minus 40° C. or lower and a flash point of 100° C. or higher.

Of these, are preferable naphthenic compounds bearing at least two rings selected from among cyclohexane ring, bicyclo [2, 2, 1]heptane ring, bicyclo [3, 2, 1] octane ring, bicyclo [2 2, 2] octane ring and bicyclo [3, 3, 0] octane ring.

Specifically, the base oil can preferably be selected from hydrogenated products from the dimers of at least one alicyclic compound selected from among bicyclo [2, 2, 1]heptane ring-bearing compounds, bicyclo [3, 2, 1] octane ring-bearing compounds, bicyclo [2 2, 2] octane ring-bearing compounds, and bicyclo [3, 3, 0] octane ring-bearing compounds; and from cyclohexane ring-bearing compounds such as 2,4-dicyclohexyl-2-methylpentane, 2,4-dicyclohexylpentane, 2,4-dicyclohexyl-2-methylbutane and 1-decahydronaphthyl-1-cyclohexylethane.

A preferable process for the production of the above-stated hydrogenated products from the dimer of alicyclic compound comprises dimerization, hydrogenation and distillation in this order of the under-mentioned olefin in which an alkyl group may substitute.

Examples of the olefin in which an alkyl group such as methyl group, ethyl group or propyl group may substitute include for instance, bicyclo [2, 2, 1]hepto-2-ene; alkenyl-substituted bicyclo [2, 2, 1]hepto-2-ene such as vinyl-substituted or isopropenyl-substituted bicyclo [2, 2, 1]hepto-2-ene; alkylidene-substituted bicyclo [2, 2, 1]hepto-2-ene such as methylene-substituted, ethylidene-substituted or isopropylidene-substituted bicyclo [2, 2, 1]hepto-2-ene; alkenyl-substituted bicyclo [2, 2, 1]heptane such as vinyl-substituted or isopropenyl-substituted bicyclo [2, 2, 1]heptane; alkylidene-substituted bicyclo [2, 2, 1]heptane such as methylene-substituted, ethylidene-substituted or isopropylidene-substituted bicyclo [2, 2, 1]heptane; bicyclo [3, 2, 1] octene; alkenyl-substituted bicyclo [3, 2, 1] octene such as vinyl-substituted or isopropenyl-substituted bicyclo [3, 2, 1] octene; alkylidene-substituted bicyclo [3, 2, 1] octene such as methylene-substituted, ethylidene-substituted or isopropylidene-substituted bicyclo [3, 2, 1] octene; alkenyl-substituted bicyclo [3, 2, 1] octane such as vinyl-substituted or isopropenyl-substituted bicyclo [3, 2, 1] octane; alkylidene-substituted bicyclo [3, 2, 1] octane such as methylene-substituted, ethylidene-substituted or isopropylidene-substituted bicyclo [3, 2, 1] octane; bicyclo [3, 3, 0] octene; alkenyl-substituted bicyclo [3, 3, 0] octene such as vinyl-substituted or isopropenyl-substituted bicyclo [3, 3, 0] octene; alkylidene-substituted bicyclo [3, 3, 0] octene such as methylene-substituted, ethylidene-substituted or isopropylidene-substituted bicyclo [3, 3, 0] octene; alkenyl-substituted bicyclo [3, 3, 0] octane such as vinyl-substituted or isopropenyl-substituted bicyclo [3, 3, 0] octane; alkylidene-substituted bicyclo [3, 3, 0] octane such as methylene-substituted, ethylidene-substituted or isopropylidene-substituted bicyclo [3, 3, 0] octane; bicyclo [2, 2, 2] octene; alkenyl-substituted bicyclo [2, 2, 2] octene such as vinyl-substituted or isopropenyl-substituted bicyclo [2, 2, 2] octene; alkylidene-substituted bicyclo [2, 2, 2] octene such as methylene-substituted, ethylidene-substituted or isopropylidene-substituted bicyclo [2, 2, 2] octene; alkenyl-substituted bicyclo [2, 2, 2] octane such as vinyl-substituted or isopropenyl-substituted bicyclo [2, 2, 2] octane; alkylidene-substituted bicyclo [2, 2, 2] octane such as methylene-substituted, ethylidene-substituted or isopropylidene-substituted bicyclo [2, 2, 2] octane.

Of these, hydrogenated products from the dimer of bicyclo [2, 2, 1]heptane ring-bearing compounds are particularly preferable. The corresponding olefin as a starting raw material is specifically exemplified by bicyclo [2, 2, 1]hepto-2-ene;
2-methylenebicyclo [2, 2, 1]heptane; 2-methylbicyclo [2, 2, 1]hepto-2-ene;
2-methylene-3-methybicyclo [2, 2, 1]heptane;
3-methylene-2-methybicyclo [2, 2, 1]heptane;
2-3-dimethylbicyclo [2, 2, 1]hepto-2-ene;
2-methylene-7-methybicyclo [2, 2, 1]heptane;
3-methylene-7-methybicyclo [2, 2, 1]heptane;
2-7-dimethylbicyclo [2, 2, 1]hepto-2-ene;
2-methylene-5-methybicyclo [2, 2, 1]heptane;
3-methylene-5-methybicyclo [2, 2, 1]heptane;
2-5-dimethylbicyclo [2, 2, 1]hepto-2-ene;
2-methylene-6-methybicyclo [2, 2, 1]heptane;
3-methylene-6-methybicyclo [2, 2, 1]heptane;
2-6-dimethylbicyclo [2, 2, 1]hepto-2-ene;
2-methylene-1-methybicyclo [2, 2, 1]heptane;
3-methylene-1-methybicyclo [2, 2, 1]heptane;
1,2-dimethylbicyclo [2, 2, 1]hepto-2-ene;
2-methylene-4-methybicyclo [2, 2, 1]heptane;
3-methylene-4-methybicyclo [2, 2, 1]heptane;
2,4-dimethylbicyclo [2, 2, 1]hepto-2-ene;
2-methylene-3,7-dimethybicyclo [2, 2, 1]heptane;
3-methylene-2,7-dimethybicyclo [2, 2, 1]heptane;
2, 3, 7-trimethylbicyclo [2, 2, 1]hepto-2-ene;
2-methylene-3,6-dimethybicyclo [2, 2, 1]heptane;
3-methylene-2,6-dimethybicyclo [2, 2, 1]heptane;
2-methylene-3,3-dimethybicyclo [2, 2, 1]heptane;
3-methylene-2,2-dimethybicyclo [2, 2, 1]heptane;
2, 3, 6-trimethylbicyclo [2, 2, 1]hepto-2-ene;
2-methylene-3-ethylbicyclo [2, 2, 1]heptane;
3-methylene-2-ethylbicyclo [2, 2, 1]heptane;
2-methyl-3-ethylbicyclo [2, 2, 1]hepto-2-ene; and the like.

The above-mentioned dimerization means not only the dimerization of same olefins but also codimerization of a plurality of different olefins.

The dimerization of an olefin is carried out usually in the presence of a catalyst by adding a solvent when necessary.

An acidic catalyst is usually employed for the dimerization, and is specifically exemplified by solid acids such as activated clay, zeolite, montmorilonite and ion exchange resin; hydrofluoric acid; mineral acids such as polyphosphoric acid; organic acids such as trifurric acid; Lewis acids such as aluminum chloride, ferric chloride, stannic chloride, boron trifluoride, boron trifluoride complex, boron tribromide, aluminum bromide, gallium chloride and gallium bromide; and organoaluminum compounds such as triethylaluminum, diethylaluminum chloride and ethylaluminum dichloride.

The amount of the above-cited catalyst to be used is not specifically limited, but is usually in the range of 0.1 to 100% by mass based on the feed olefin.

In the case of dimerization, a solvent is not always necessary, but is usable in view of the handling of the feed olefin and the catalyst at the time of reaction or the control of proceeding of reaction. Examples of such solvents include saturated hydrocarbon such as various pentane, various hexane, various octane, various nonane and various decane; alicyclic hydrocarbons such as cyclopentane, cyclohexane, methylcyclohexane and decalin; ether compounds such as diethyl ether and tetrahydrofuran; halogen-containing compounds such as methylene chloride and dichloroethane and nitro compounds such as nitrometahne and nitrobenzene.

In the case of dimerization in the presence of the catalyst, the reaction temperature is generally in the range of minus 70 to 200° C. Proper reaction conditions are set in the temperature range depending on the types of catalyst and additives, including a reaction pressure being usually atmospheric pressure and a reaction time being usually in the range of 0.5 to 10 huors.

Subsequently, the dimer of feedstock olefin thus obtained is hydrogenated to produce the objective hydrogenated product of dimer, wherein the hydrogenation may be carried out by properly mixing different dimers which have been dimerized by using individual feedstock olefin separately.

The hydrogenation reaction is carried out usually in the presence of a catalyst, which is exemplified by hydrogenation catalyst such as nickel, ruthenium, palladium, platinum, rhodium and iridium.

The amount of the above-cited catalyst to be used is usually in the range of 0.1 to 100% by mass based on the dimerized products.

While the hydrogenation reaction proceeds in the absence of a solvent as is the case with the above-stated dimerization reaction, a solvent can be used, and is exemplified by saturated hydrocarbon such as various pentane, various hexane, various octane, various nonane and various decane; alicyclic hydrocarbons such as cyclopentane, cyclohexane, methylcyclohexane and decalin It is possible to proceed with the hydrogenation reaction at a reaction temperature of usually of 20 to 300° C., a reaction pressure of atmospheric pressure to 20 Mpa and a reaction time of usually 1 to 10 hours. The resultant hydrogenated product may be mixed with other hydrogenated product which has been formed from separate feedstock olefin in a separate step so that the resultant mixture is used as the base oil as the component (A).

Next, the viscosity index improver as the component (B) to be mixed with the base oil as the component (A) is at least one polymer which has a weight average molecular weight in the range of 8,000 to 40,000 and which is selected from among (a) hydrocarbon polymers each containing as a constituent at least 10 mole % of a monomer bearing a cyclic structure, (b) hydrocarbon polymers each containing at least 25% of quaternary carbon atoms in the backbone chain, and (c) hydrogenated products from the polymers (a) and (b).

The weight average molecular weight of the polymer as the component (B), when being less than 8,000, leads to extremely small working effect on viscosity index improvement, whereas said molecular weight, when being more than 40,000, brings about inferior shear stability causing severed polymer chain on use and marked decrease in permanent viscosity, thus rendering the polymer unsuitable and unfavorable as a viscosity index improver for traction oils. The weight average molecular weight thereof is in the range of preferably 9,000 to 38,000, more preferably 9,000 to 35,000, particularly preferably 10,000 to 35, 000.

The monomer bearing a cyclic structure in item (a) is exemplified by aromatic monomers such as styrene, p-methylstyrene, α-methylstyrene, vinylnaphthalene and indene; alicyclic monomers such as vinylcyclohexane, vinylcyclohexene, cyclohexene, dipentene and limonene; and crosslinked cyclic monomers such as bicycle [2, 2, 1]heptene; methylbicycle [2, 2, 1]heptene; dimethylbicycle [2, 2, 1]heptene; dicyclopentadiene; dihydrodicyclopentadiene; and tetracyclo $[6. 2. 1. 1^{3.6} 0^{2.7}]$ dodecene.

The hydrocarbon polymer as the component (a), which is a polymer of the foregoing monomer bearing a cyclic structure, or a copolymer of said monomer bearing a cyclic structure and an aliphatic monomer such as ethylene, propylene, butene, butadiene, pentene, hexene, heptene, octene, nonene and decene, contains at least 10 mole % of a monomer bearing a cyclic structure. The monomer content of less than 10 mole % is unfavorable because of lowered traction coefficient, the content of at least 20 mole % is preferable, and at least 40 mole % is more preferable.

The hydrocarbon polymers as the component (b) are those each containing at least 25% of quaternary carbon atoms in the backbone chain, are exemplified by polyisobutylene, isobutylene/ethylene copolymer, isobutylene/propylene copolymer, isobutylene/butene copolymer and the like, and contain at least 50 mole % of isobutylene in the case of isobutylene copolymer. The content of quaternary carbon atoms in the backbone chain of less than 25% is unfavorable because of lowered traction coefficient, the content of at least 30 mole % is preferable, and at least 40 mole % is more preferable.

The hydrocarbon polymers as the component (c) are each a hydrogenated product from the polymers (a) and (b). Since an olefinic double bond deteriorates antioxidation stability when remaining in the polymer, it is desirable to completely remove all of olefins. In the case of polymer bearing aromatic rings, the aromatic rings may be hydrogenated in whole or in part. The degree of hydrogenation of the aromatic rings may be regulated at need in accordance with the solubility in the base oil.

The blending ratio of the component (B) (viscosity index improver) to the component (A) (base oil), which cannot be unequivocally determined but is determined by the viscosity of the base oil, is in the range of preferably 0.1 to 20% by mass. The blending ratio thereof, when being less than 0.1% by mass, sometimes results in failure to exert the effect on viscosity index improvement, whereas the blending ratio, when being more than 20% by mass, sometimes brings about excessively high low-temperature viscosity and besides, marked decrease in permanent viscosity. In view of the foregoing, the blending ratio is in the range of preferably 0.5 to 5% by mass.

It is possible to use the traction drive fluid composition according to the present invention by blending therewith at need, a proper amount of any of additives including viscosity index improvers other than the foregoing, antioxidants, rust preventives, detergent dispersants, pour point depressants, extreme pressure additives, antiwear agents, oilness improvers, antifoaming agents, corrosion inhibitors and the like.

EXAMPLE

In what follows, the present invention will be described more specifically with reference to working examples, which however shall never limit the present invention thereto.

Reference Example 1

An autoclave made of stainless steel and having a capacity of two liter was charged with 561 g (8 mole) of crotonaldehyde and 352 g (2.67 mole) of cyclopentadiene, so that the contents therein was reacted at 170° C. for 3 hours under stirring. The resultant reaction solution was cooled to room temperature, and thereafter 18 g of Raney nickel catalyst (available from Kawaken Fine Chemicals Co., Ltd. under the trade name M-300T) to proceed with hydrogenation reaction under a hydrogen pressure of 0.9 MPa·G at a reaction temperature of 150° C. for 4 hours. After cooling the resultant reaction solution, the catalyst was filtered off, and the filtrate was subjected to vacuum distillation to produce 565 g of a fraction at 105° C./2.66 kPa. As a result of analysis of the resultant fraction by means of mass spectrum and nuclear magnetic resonance spectrum, the fraction was confirmed to be 2-hydroxymethyl-3-methylbicyclo [2. 2. 1]heptane.

Subsequently, in a flow system atmospheric tubular reactor made of quartz glass measuring 20 mm in outer diameter and 500 mm in length was placed 20 g of gamma alumina (available from Nikki Chemical Industrial Co., Ltd. under the trade name N612) to carry out dehydration reaction at a reaction temperature of 285° C. at a weight hourly space velocity (WHSV) of 1.1 hr$^{-1}$. As a result, there was obtained 490 g of a dehydration reaction olefinic product of
2-hydroxymethyl-3-methylbicyclo [2.2.1]heptane containing
2-methylene-3-methylbicyclo [2. 2. 1]heptane and
2-hydroxymethyl-3-methylbicyclo [2. 2. 1]hepto-2-ene.

In a four-neck flask having a capacity of one liter were placed 10 g of boron trifluoride diethyl ether complex and 490 g of the previously obtained olefinic compound to proceed with dimerization reaction at 10° C. for 5 hours under stirring. The resultant reaction mixture, after washed with a dilute aqueous solution of sodium hydroxide and saturated brine, was hydrogenated in an autoclave having a capacity of one liter in the presence of 15 g of a hydrogenation nickel/diatomaceous earth catalyst added therein (available from Nikki Chemical Industrial Co., Ltd. under the trade name N-113) under a hydrogen pressure of 3 MPa·G at a reaction temperature of 250° C. for 5 hours. After the completion of the reaction, the catalyst was removed by filtration and the filtrate was subjected to vacuum distillation to obtain 340 g of an objective dimer as hydrogenated product (hereinafter referred to as Fluid A). The properties of the Fluid A, the results of ultrasonic shear stability test (JPI-5S-29-88) and the results of traction coefficient measurement are given in Table 1.

Reference Example 2

In a four-neck flask equipped with a reflux condenser, a stirrer and a thermometer and having a capacity of 500 milliliter, were placed 4 g of activated clay (available from Mizusawa Chemical Industrial Co., Ltd. under the trade name Galeon Earth), 10 g of diethylene glycol monoethyl ether and 200 g of α-methylstyrene, and the content therein was heated to a reaction temperature of 105° C. under stirring for 4 hours. After the completion of the reaction, the resultant reaction mixture was analyzed by gas chromatography, and thus was proved to be the objective linear dimer of α-methylstyrene at 70% conversion and 95% selectivity, a cyclic dimer of α-methylstyrene as a byproduct at 1% selectivity and a trimer of high boilng point at 4% selectivity. By subjecting the reaction mixture to hydrogenation and vacuum distillation in the same manner as in Reference Example 1, there was obtained 125 g of hydrogenated linear dimer of α-methylstyrene having purity of 99%, that is, 2,4-dicyclohexyl-2-methylpentane (hereinafter referred to as Fluid B). The properties of the Fluid B, the results of ultrasonic shear stability test (JPI-5S-29-88) and the results of traction coefficient measurement are given in Table 1.

Example 1

An autoclave having a capacity of one liter were placed 15 g of a hydrogenation nickel/diatomaceous earth catalyst (available from Nikki Chemical Industrial Co., Ltd. under the trade name N-113), 20 g of polystyrene ($M_W$: 160,000) and 500 milliliter of cyclohexane to carry out hydrogenation reaction under a hydrogen pressure of 6 MPa·G at a reaction temperature of 250° C. for 3 hours. After cooling the reaction product, the catalyst was removed by filtration and the filtrate was subjected to evaporation to bone dryness, followed by vacuum distillation to obtain 19 g of hydrogenated polystyrene (hereinafter referred to as Polymer "a"). As the result of the measurement thereof by means of GPC, the Polymer "a" had a weight average molecular weight of 14,000 expressed in terms of polystyrene. The Polymer "a" at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Example 2

The procedure in Example 1 was repeated except that the hydrogenation reaction was performed for 30 minutes by the use of 20 g of ethylene/styrene copolymer (styrene 63 mole %, $M_W$: 160,000) in place of 20 g of polystyrene ($M_W$: 160,000). Thus there was obtained 19 g of hydrogenated product of ethylene/styrene copolymer (hereinafter referred to as Polymer "b"). As the result of the measurement thereof by means of GPC, the Polymer "b" had a weight average molecular weight of 18,000 expressed in terms of polystyrene. The Polymer "b" at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Example 3

The procedure in Example 1 was repeated except that the hydrogenation reaction was performed for 40 minutes by the use of 20 g of ethylene/styrene copolymer (styrene 50 mole %, $M_W$: 200,000) in place of 20 g of polystyrene ($M_W$: 160,000). Thus there was obtained 19 g of hydrogenated product of ethylene/styrene copolymer (hereinafter referred to as Polymer "c"). As the result of the measurement thereof by means of GPC, the Polymer "c" had a weight average molecular weight of 9,000 expressed in terms of polystyrene. The Polymer "c" at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Comparative Example 1

The procedure in Example 3 was repeated except that the hydrogenation reaction was performed at the temperature of 200° C. for 4 hours in place of at the temperature of 250° C. for 40 minutes. Thus there was obtained 19 g of hydrogenated product of ethylene/styrene copolymer (hereinafter referred to as Polymer "d"). As the result of the measurement thereof by means of GPC, the Polymer "d" had a weight average molecular weight of 120,000 expressed in terms of polystyrene. The polymer "d" at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Comparative Example 2

The procedure in Example 3 was repeated except that the hydrogenation reaction was performed at the temperature of 250° C. for 4 hours in place of 250° C. for 40 minutes. Thus there was obtained 19 g of hydrogenated product of ethylene/ styrene copolymer (hereinafter referred to as Polymer "e"). As the result of the measurement thereof by means of GPC, the Polymer "e" had a weight average molecular weight of 5,000 expressed in terms of polystyrene. The Polymer "e" at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Comparative Example 3

Ethylene/propylene copolymer available on the market (available from Mitsui Chemical Industrial Co., ltd. under the trade name "Lucant HC-3000X", weight average molecular weight of 18,000 expressed in terms of polystyrene) at a ratio of 1.5% by mass was mixed with the Fluid A of Reference Example 1 to obtain a fluid composition. The properties of the fluid composition, the results of ultrasonic shear stability test (JPI-5S-29-88) and the results of traction coefficient measurement are given in Table 1.

Example 4

Polymer "b" obtained in Example 2 at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Example 5

In a one liter autoclave were placed 15 g of a hydrogenation nickel/diatomaceous earth catalyst (available from Nikki Chemical Industrial Co., Ltd. under the trade name N-113), 20 g of polyisobutylene (available from BASF corporation under the trade name "OPPANOL·B10, weight average molecular weight of 47,000 expressed in terms of polystyrene) and 500 milliliter of cyclohexane to carry out hydrogenation reaction under a hydrogen pressure of 5 MPa·G at a reaction temperature of 280° C. for 8 hours. After cooling the reaction product, the catalyst was removed by filtration and the filtrate was subjected to evaporation to bone dryness followed by vacuum distillation to obtain 19 g of hydrogenated polyisobutylene (hereinafter referred to as Polymer "f"). As the result of the measurement thereof by means of GPC, the Polymer "f" had a weight average molecular weight of 32,000 expressed in terms of polystyrene. The Polymer "f" at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Comparative Example 4

Polyisobutylene (available from BASF corporation under the trade name "OPPANOL·B10, weight average molecular weight of 47,000 expressed in terms of polystyrene) at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Example 6

Ethylene/α-methylstyrene copolymer which had been produced through polymerization (α-methylstyrene moiety of 50 mole %, weight average molecular weight of 13,000 expressed in terms of polystyrene) at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Example 7

Ethylene/norbornene copolymer which had been produced through polymerization (norbornene moiety of 40 mole %, weight average molecular weight of 23,000 expressed in terms of polystyrene) at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Example 8

Ethylene/dicyclopentadiene copolymer which had been produced through polymerization (dicyclopentadiene moiety of 50 mole %, weight average molecular weight of 38,000 expressed in terms of polystyrene) at a ratio of 1.5% by mass was mixed with the Fluid B of Reference Example 2 to obtain a fluid composition. The properties of the fluid composition, the results of ultrasonic shear stability test (JPI-5S-29-88) and the results of traction coefficient measurement are given in Table 1.

Measurements were made of the traction coefficients in examples and comparative examples by the use of a two-cylinder friction tester. Specifically, traction coefficients were determined by means of two cylinders in contact with each other in cylindrical direction which had same diameter of 52 mm and a thickness of 6 mm and which were composed of a drum-shaped driven cylinder with a curvature radius of 10 mm and a flat driving cylinder without crowning by rotating either one at a constant velocity and other one at a continuously varied velocity, applying a load of 98.0 N to the contact portion of both the cylinders by means of a weight, and measuring the tangent force generating between both the cylinders, that is, the objective traction coefficient. Therein, the cylinders were made of bearing steel SUJ and mirror finished, the average peripheral velocity was 6.8 m/second, and maximum hertz contact pressure was 1.23 GPa. In measuring the traction coefficient of the fluid at a fluid temperature (oil temperature) of 140° C., the oil temperature was raised to 140° C. from 40° C. by heating an oil tank with a heater, whereby the traction coefficient thereof was determined at a slip factor of 5%.

TABLE 1

| | Reference Example 1 | Reference Example 2 | Example 1 | Example 2 | Example 3 | Comp. Example 1 | Comp. Example 2 | Comp. Example 3 | Example 4 | Example 5 | Comp. Example 4 | Example 6 | Example 7 | Example 8 |
|---|---|---|---|---|---|---|---|---|---|---|---|---|---|---|
| Kinematic viscocity @ 40° C., mm$^2$/s | 17.32 | 20.23 | 22.01 | 24.05 | 21.27 | 42.72 | 20.68 | 23.18 | 26.41 | 28.31 | 32.48 | 24.87 | 25.06 | 26.12 |
| Kinematic viscosity @ 100° C., mm$^2$/s | 3.578 | 3.572 | 4.307 | 4.649 | 4.162 | 7.971 | 4.033 | 4.622 | 4.53 | 4.84 | 5.339 | 4.275 | 4.737 | 4.891 |
| Viscosity index | 77 | 13 | 101 | 110 | 94 | 161 | 85 | 116 | 72 | 87 | 95 | 56 | 108 | 110 |
| Viscosity decrease after shear stability test, % | −0.1 | −0.1 | −0.6 | −0.9 | −0.5 | −31.5 | −0.2 | −0.7 | −0.9 | −0.9 | −7.3 | −2.8 | −1.1 | −2.3 |
| Traction coefficient @ 140° C. | 0.077 | 0.070 | 0.077 | 0.077 | 0.077 | 0.077 | 0.077 | 0.074 | 0.071 | 0.07 | 0.07 | 0.07 | 0.077 | 0.077 |

It is understandable from Table 1 that in comparison with the comparative examples, the examples have brought about improved viscosity index and excellent shear stability without lowering traction coefficient.

In addition thereto, the present invention not only has brought about enhanced viscosity index merely due to enhanced kinematic viscosity, but also has optimized the following three respects:
(1) Even the viscosity is increased, the performance of enhancing viscosity index is different depending upon the polymer to be added.
(2) Conventional polymer as a viscosity index improver, even when added in a small amount, greatly lowers the traction coefficient.
(3) The performance of enhancing viscosity index increases, but the shear stability decreases with an increase in the molecular weight of the polymer,

INDUSTRIAL APPLICABILITY

The traction drive fluid composition according to the present invention is improved in viscosity index and is excellent in shear stability without being lowered in traction coefficient, can be practically utilized as a traction drive system CVT oil all over the world.

The invention claimed is:

1. A traction drive fluid composition which comprises
component (A) a base oil for traction drives selected from
hydrogenated products of the dimers of at least one alicyclic compound selected from among bicyclo [2, 2, 1]heptane ring-bearing compounds, bicyclo [3, 2, 1] octane ring-bearing compounds, bicyclo [2 2, 2] octane ring-bearing compounds, and bicyclo [3, 3, 0] octane ring-bearing compounds; and
from cyclohexane ring-bearing compounds selected from the group consisting of 2,4-dicyclohexyl-2-methylpentane, 2,4-dicyclohexylpentane, 2,4-dicyclohexyl-2-methylbutane, and 1-decahydronaphthyl-1-cyclohexylethane and
component (B) at least one polymer having a weight average molecular weight in the range of 8,000 to 40,000 and which is selected from the group consisting of (a) hydrocarbon polymers each comprising as a constituent at least 10 mole % of a monomer bearing a cyclic structure and (c) hydrogenated products from the polymers (a); wherein each of the hydrocarbon polymers (a) is a polymer of a monomer bearing a cyclic structure, or a copolymer of a monomer bearing a cyclic structure and an aliphatic monomer selected from the group consisting of ethylene, propylene, butene, pentene, hexene, heptene, octane, nonene and decene;
wherein the monomer bearing a cyclic structure is selected from the group consisting of styrene, vinylnaphthalene, indene, vinylcyclohexane, vinylcyclohexene, cyclohexene, dipentene, limonene, bicyclo [2,1,1] heptene, methylbicyclo [2,2,1] heptene, dimethylbicyclo [2,2,1] heptene, dicyclopentadiene, dihydrodicyclopentadiene, and tetracyclo [6.2.1.1$^{3,6}$0$^{2,7}$]dodecene; and
wherein a blending ratio of the component (B) is 0.5 to 5% by mass based on the composition.

2. The traction drive fluid composition according to claim 1, wherein the component (B) polymer has a weight average molecular weight in the range of 9,000 to 38,000.

3. The traction drive fluid composition according to claim 1, wherein the component (A) base oil has a traction coefficient at 140° C. of at least 0.070, kinematic viscosity at 40° C. in the range of 10 to 25 mm$^2$/s, a viscosity index of at least 60, a pour point of minus 40° C. or lower and a flash point of 100° C. or higher.

4. The traction drive fluid composition according to claim 1, wherein the component (B) polymer is blended in an amount of 0.1 to 1.5%.

5. The traction drive fluid composition according to claim 1, wherein the component (B) polymer has a weight average molecular weight ranging from 14,000 to 40,000.

6. The traction drive fluid composition according to claim 2, wherein the component (A) base oil has a traction coefficient at 140° C. of at least 0.070, kinematic viscosity at 40° C. in the range of 10 to 25 mm$^2$/s, a viscosity index of at least 60, a pour point of minus 40° C. or lower and a flash point of 100° C. or higher.

7. The traction drive fluid composition according to claim 1, wherein the component (A) base oil for traction drives is a hydrogenated product of the dimer of a bicyclo [2, 2, 1] heptane ring-bearing compound.

8. The traction drive fluid composition according to claim 1, wherein the component (A) base oil for traction drives is a hydrogenated product of the dimer of a bicyclo [3, 2, 1] octane ring-bearing compound.

9. The traction drive fluid composition according to claim 1, wherein the component (A) base oil for traction drives is a hydrogenated product of the dimer of a bicyclo [2 2, 2] octane ring-bearing compound.

10. The traction drive fluid composition according to claim 1, wherein the component (A) base oil for traction drives is a hydrogenated product of the dimer of a bicyclo [3, 3, 0] octane ring-bearing compound.

11. The traction drive fluid composition according to claim 1, wherein the component (A) base oil for traction drives is selected from cyclohexane ring-bearing compounds selected from the group consisting of 2,4-dicyclohexyl-2-methylpentane, 2,4-dicyclohexylpentane, 2,4-dicyclohexyl-2-methylbutane, and 1-decahydronaphthyl-1-cyclohexylethane.

12. The traction drive fluid composition according to claim 11, wherein the component (A) base oil for traction drives comprises 2,4-dicyclohexyl-2-methylpentane.

13. The traction drive fluid composition according to claim 11, wherein the component (A) base oil for traction drives comprises 2,4-dicyclohexylpentane.

14. The traction drive fluid composition according to claim 11, wherein the component (A) base oil for traction drives comprises 2,4-dicyclohexyl-2-methylbutane.

15. The traction drive fluid composition according to claim 11, wherein the component (A) base oil for traction drives comprises 1-decahydronaphthyl-1-cyclohexylethane.

16. The traction drive fluid composition according to claim 1, wherein component (B) is selected form the group consisting of hydrogenated polystyrene, hydrogenated ethylene/styrene copolymer, ethylene/norbornene copolymer, and ethylene/dicyclopentadiene copolymer.

17. The traction drive fluid composition according to claim 7, wherein component (B) is selected form the group consisting of hydrogenated polystyrene, hydrogenated ethylene/styrene copolymer, ethylene/norbornene copolymer, and ethylene/dicyclopentadiene copolymer.

18. The traction drive fluid composition according to claim 12, wherein component (B) is selected form the group consisting of hydrogenated polystyrene, hydrogenated ethylene/styrene copolymer, ethylene/norbornene copolymer, and ethylene/dicyclopentadiene copolymer.

19. The traction drive fluid composition of claim 1, wherein the at least one polymer of the component (B) has a weight average molecular weight ranging from 9,000 to 40,000.

20. The traction drive fluid composition of claim 1, wherein the at least one polymer of the component (B) has a weight average molecular weight ranging from 9,000 to 38,000.

21. A method of operating a continuously variable transmission, the method comprising operating the continuously variable transmission with the traction drive fluid composition of claim 1.

22. A method of operating a continuously variable transmission, the method comprising operating the continuously variable transmission with the traction drive fluid composition of claim 2.

23. A method of operating a continuously variable transmission, the method comprising operating the continuously variable transmission with the traction drive fluid composition of claim 3.

24. A method of operating a continuously variable transmission, the method comprising operating the continuously variable transmission with the traction drive fluid composition of claim 4.

25. A method of operating a continuously variable transmission, the method comprising operating the continuously variable transmission with the traction drive fluid composition of claim 5.

26. A method of operating a continuously variable transmission, the method comprising operating the continuously variable transmission with the traction drive fluid composition of claim 6.

27. The traction drive fluid composition of claim 1, wherein component (A) is a base oil for traction drives selcted from hydrogenated products of the dimers of at least one alicyclic compound selected from bicyclo[2.2.1]heptane ring-bearing compounds and 2,4-dicyclohexyl-2-methylpentane, and wherein in component (B), the monomer bearing a cyclic structure is styrene and the aliphatic monomer is ethylene.

* * * * *